US012796700B2

(12) United States Patent
Van Erp

(10) Patent No.: US 12,796,700 B2
(45) Date of Patent: Nov. 17, 2026

(54) APPARATUS AND METHOD FOR THAWING FOODSTUFF

(71) Applicant: GEA FOOD SOLUTIONS BAKEL B.V., Bakel (NL)

(72) Inventor: Joost Van Erp, Nuenen (NL)

(73) Assignee: GEA Food Solutions Bakel B.V., Bakel (NL)

( * ) Notice: Subject to any disclaimer, the term of this patent is extended or adjusted under 35 U.S.C. 154(b) by 674 days.

(21) Appl. No.: 18/024,073

(22) PCT Filed: Aug. 26, 2021

(86) PCT No.: PCT/EP2021/073619
§ 371 (c)(1),
(2) Date: Mar. 1, 2023

(87) PCT Pub. No.: WO2022/048989
PCT Pub. Date: Mar. 10, 2022

(65) Prior Publication Data

US 2023/0292796 A1 Sep. 21, 2023

(30) Foreign Application Priority Data

Sep. 3, 2020 (EP) .................................... 20194336

(51) Int. Cl.
*G01N 22/00* (2006.01)
*A23B 2/00* (2025.01)
(Continued)

(52) U.S. Cl.
CPC ................ *A23B 2/82* (2025.01); *A23B 2/001* (2025.01); *A23B 2/805* (2025.01); *A23B 4/066* (2013.01); *A23B 4/07* (2013.01); *G01N 22/00* (2013.01)

(58) Field of Classification Search
CPC ........... A23B 2/82; A23B 2/001; A23B 2/805; A23B 4/066; A23B 4/07; G01N 22/00
See application file for complete search history.

(56) References Cited

U.S. PATENT DOCUMENTS 4,870,234 A * 9/1989 Steers .................... H05B 6/666 374/149
5,036,172 A * 7/1991 Kokkeler ............. H05B 6/6452 374/149
(Continued)

FOREIGN PATENT DOCUMENTS

WO 2015/107100 A1 7/2015
WO 2016/193487 A1 12/2016

OTHER PUBLICATIONS

International Search Report and Written Opinion dated Dec. 22, 2021, for International Application PCT/EP2021/073619.
(Continued)

*Primary Examiner* — Steven N Leff
(74) *Attorney, Agent, or Firm* — The Dobrusin Law Firm, P.C.

(57) ABSTRACT

An apparatus and method for thawing foodstuff that includes a thawing chamber for accommodating the foodstuff, the thawing chamber includes a sensor for sensing a level of frozenness of the foodstuff in the thawing chamber, the sensor includes a microwave transmitter and a microwave receiver that is spaced from the microwave transmitter, the microwave receiver configured to receive a transmission signal transmitted by the microwave transmitter, the microwave transmitter and the microwave receiver are arranged inside the thawing chamber such that the foodstuff is, at least temporarily, situated between the microwave transmitter and the microwave receiver during a thawing process carried out with the apparatus.

20 Claims, 4 Drawing Sheets

(51) Int. Cl.

| | |
|---|---|
| ***A23B 2/80*** | (2025.01) |
| ***A23B 2/82*** | (2025.01) |
| ***A23B 4/06*** | (2006.01) |
| ***A23B 4/07*** | (2006.01) |

(56) References Cited

U.S. PATENT DOCUMENTS

| | | | | |
|---|---|---|---|---|
| 5,780,821 | A * | 7/1998 | Choi ...................... | H05B 6/688 219/703 |
| 2016/0331004 | A1 * | 11/2016 | Strolenberg ............. | A23B 2/82 |
| 2018/0164209 | A1 | 6/2018 | Stiens et al. | |
| 2020/0178547 | A1 * | 6/2020 | Van Erp ............... | H05B 1/0261 |

OTHER PUBLICATIONS

International Preliminary Report on Patentability dated Nov. 23, 2022, for International Application PCT/EP2021/073619.

* cited by examiner

APPARATUS AND METHOD FOR THAWING FOODSTUFF

CROSS-REFERENCE TO RELATED APPLICATIONS

This application is a US National Stage of PCT/EP2021/073619 filed on Aug. 26, 2021, which claims priority to EP 20194336.2 filed on Sep. 3, 2020, all of which are hereby incorporated by reference herein for all purposes.

FIELD

The invention concerns an apparatus for thawing foodstuff, preferably a thawing tumbler or a thawing mixer, comprising a thawing chamber for accommodating foodstuff. Additionally, the invention concerns a method for thawing foodstuff in a thawing apparatus, preferably in a thawing tumbler or in a thawing mixer, comprising a thawing chamber for accommodating foodstuff.

BACKGROUND

An apparatus for thawing foodstuff in the form of meat has been disclosed in WO 2015/107 100 A1. The apparatus comprises a closed thawing chamber that may be rotated when thawing the foodstuff accommodated in the thawing chamber. Another element of this apparatus is a sensor, which measures the dielectric constant of the food product to be thawed. The sensor detects microwave radiation that is reflected by the foodstuff in the thawing chamber. Thus, it is possible to determine the amount of power absorbed. However, it has become evident that reflection measurements are subject to rather high variations and primarily serve to determine the level of frozenness of a portion at the surface of the foodstuff. Consequently, the level of frozenness of the foodstuff, in particular deep inside the foodstuff, cannot be reliably determined.

A sensor for detecting a level of frozenness of foodstuff has been described in WO 2016/193 487 A1. The sensor carries out a transmission or a reflection measurement and is either used in batch processing, when the foodstuff is not in motion, or in in continuous processing, when the foodstuff is carried by a transporting means, such as a conveyor belt or a spiral conveyor.

SUMMARY

Against this background the problem to be solved is to reliably measure the level of frozenness of foodstuff accommodated in a thawing chamber.

For solving the problem the invention proposes an apparatus for thawing foodstuff comprising a thawing chamber for accommodating foodstuff, wherein the thawing chamber includes a sensor for sensing a level of frozenness of the foodstuff accommodated in the thawing chamber, the sensor comprising a microwave transmitter and a microwave receiver that is spaced from the microwave transmitter, the microwave receiver further being configured to receive a transmission signal transmitted by the microwave transmitter, wherein the microwave transmitter and the microwave receiver are arranged inside the thawing chamber such that the foodstuff is, at least temporarily, situated between the microwave transmitter and the microwave receiver during a thawing process carried out with the apparatus.

According to the invention, the microwave transmitter and the microwave receiver are arranged inside the thawing chamber such that the foodstuff—when being thawed—is, at least temporarily, situated between the microwave transmitter and the microwave receiver. Consequently, a transmission measurement can be carried out by the sensor in order to determine the level of frozenness of the foodstuff inside the thawing chamber.

The apparatus for thawing foodstuff is preferably a thawing tumbler or a thawing mixer. The apparatus is preferably configured for thawing foodstuff in the form of meat, poultry, or fish.

The microwave transmitter preferably transmits a single frequency signal or a narrow bandwidth signal. The single frequency may be a frequency in the range of 0.1 GHz to 10 THz, in particular 810 MHz or 960 MHz or 1.160 GHz. The microwave transmitter preferably works with a transmit power of less than 1 mW, preferably less than 0.5 mW, e.g. 0.1 mW.

According to a preferred embodiment of the invention, the apparatus comprises a base wherein the thawing chamber is arranged movably with respect to the base. With such apparatus it is possible to move the foodstuff inside the thawing chamber. Preferably the thawing chamber is arranged such that it is movable with respect to the base during the thawing process. The thawing chamber may comprise a lid that may be opened for feeding foodstuff into the thawing chamber and may be closed during thawing. According to a particularly preferred embodiment, the thawing chamber is arranged rotatably about an axis of rotation with respect to the base. The rotatable thawing chamber may be a vessel of a thawing tumbler. The thawing chamber of the apparatus may comprise a sidewall, a bottom and top. The bottom and/or the top can be designed as a lid. The axis of rotation of the thawing chamber is preferably inclined relative to a horizontal plane. The angle of inclination is preferably altered based on, for example on the product to be thawed, the filling degree of the thawing chamber and/or the condition under which the thawing takes place.

Preferably, the sensor is arranged at a fixed location inside the thawing chamber such that the sensor is movable together with the thawing chamber. Thereby, it is possible to carry out a transmission measurement using the sensor even when the thawing chamber is moving, in particular rotating, with respect to the base. During movement of the thawing chamber the foodstuff moves insides the thawing chamber and is at least temporarily situated between the microwave transmitter and the microwave receiver of the sensor.

In this context, it is preferred that the apparatus comprises a position detector for detecting a position of the thawing chamber, in particular a position of the sensor, with respect to the base, wherein the apparatus is configured to sense the level of frozenness depending on the position of the thawing chamber detected by the position detector. The position detector may be part of the thawing chamber, in particular part of the sensor, or may be arranged separate from the thawing chamber, e.g. as part of the base of the apparatus. The position detector may include a motion sensor, in particular if the position detector is part of the thawing chamber or the sensor. Alternatively, the position detector may include an angle encoder or angular sensor for detecting an angular position of the thawing chamber relative to the base of the apparatus. It is particularly preferred that the apparatus is configured to sense the level of frozenness only if the position of the thawing chamber detected by the position detector lies within a predefined range of positions. The predefined range of positions preferably includes one or more positions in which the sensor of the thawing chamber is situated in a lower area of the thawing chamber so that foodstuff is forced towards the sensor, in particular between the microwave transmitter and the microwave receiver, by the force of gravity. Thereby, it may be ensured that foodstuff is present between the microwave transmitter and the microwave receiver in order to correctly determine the level of frozenness of the foodstuff.

According to a preferred embodiment of the invention, the apparatus includes a processing unit that is configured to analyze the amplitude of the transmission signal received by the microwave receiver. Analyzing the transmission signal, in particular comparing the amplitude of the signal transmitted by the microwave transmitter and the transmission signal received by the microwave receiver, may indicate an amount of energy absorbed by the foodstuff. It has been found that the amplitude of the transmission signal is well suited for indicating the level of frozenness of the foodstuff. It is particularly preferred that the processing unit is included in the sensor of the apparatus. The processing unit may include a processor, e.g. a programmable processor, and/or a vector network analyzer (VNA). The processing unit may receive the signal transmitted by the microwave transmitter and the transmission signal received by the microwave receiver.

In this context, it is preferred that the processing unit is further configured to analyze a phase of the transmission signal received by the microwave receiver, preferably a phase difference between the signal transmitted by the microwave transmitter and the transmission signal received by the microwave receiver. By analyzing both the amplitude and the phase of the transmission signal the reliability of determining the level of frozenness can be improved as compared to analyzing only the amplitude, in particular for foodstuff comprising bigger chunks.

According to a preferred embodiment of the invention, the sensor further comprises an electrical energy storage, preferably a battery. Thereby, the sensor can operate without being connected through electrical wires to the power supply of the apparatus. A sensor having an electrical energy storage is especially preferred if the sensor is arranged in a thawing chamber that is movable, in particular rotatable, with respect to a base of the apparatus.

According to a preferred embodiment of the invention, the thawing chamber comprises one or more mixing elements that are movably, preferably rotatably, arranged inside the thawing chamber.

According to a preferred embodiment of the invention, the apparatus comprises a steam generator connected to the thawing chamber so as to feed steam into the thawing chamber. The steam may facilitate thawing of the foodstuff by condensing on the foodstuff. Because of the high energy content of steam in comparison to boiling water, thermal energy can be transferred to the foodstuff very efficiently.

According to a preferred embodiment of the invention, the apparatus comprises a vacuum generator connected to the thawing chamber so as to create a vacuum inside the thawing chamber. The vacuum generator may include a vacuum pump. The vacuum generator is especially beneficial in conjunction with a steam generator. With both, a vacuum generator and a steam generator, the thawing chamber may be operated at a pressure less than ambient pressure, i.e. at vacuum conditions. The apparatus may be configured to reestablish a pressure less than ambient pressure, preferably a vacuum, after each injection of steam by the steam generator. The combination of vacuum and steam may be employed to ensure that the surface of the foodstuff is not getting to hot. For example, the vacuum may ensure that the maximum condensation temperature will stay below the maturing temperature.

According to a preferred embodiment of the invention, the apparatus comprises a controller that is connected to the sensor via a communication link, wherein the controller is configured to stop a thawing process depending on the level of frozenness detected by the sensor. The communication link may be a wireless communication link. With a wireless communication link, electrical connection lines between the controller and the sensor may be omitted, thereby facilitating arranging the sensor in a thawing chamber that is movable with respect to the base of the apparatus.

For solving the problem the invention further proposes a method for thawing foodstuff in a thawing apparatus comprising a thawing chamber for accommodating foodstuff, wherein the thawing chamber includes a sensor for sensing a level of frozenness of the foodstuff accommodated in the thawing chamber, the sensor comprising a microwave transmitter and a microwave receiver that is spaced from the microwave transmitter, the method comprising:

- thawing the foodstuff in the thawing chamber, wherein the foodstuff is, at least temporarily, situated between the microwave transmitter and the microwave receiver of the sensor; and
- measuring a transmission signal transmitted by the microwave transmitter using the microwave receiver.

The method may achieve the same technical effects and advantages as described in conjunction with the inventive apparatus for thawing foodstuff.

The apparatus used with the method for thawing foodstuff is preferably a thawing tumbler or a thawing mixer. The apparatus is preferably configured for thawing foodstuff in the form of meat, poultry, or fish. The apparatus may include one or more of the features that have been described before.

Thawing the foodstuff may comprise heating parts of the thawing chamber or the complete thawing chamber. For example, a wall of the thawing chamber may be heated for thawing the foodstuff and/or the thawing chamber may comprise heated baffles and/or heated paddles. Thawing the foodstuff may alternatively or additionally comprise feeding steam into the thawing chamber. The steam may facilitate thawing of the foodstuff by condensing on the foodstuff. During thawing of the foodstuff, the thawing chamber may be operated at a pressure less than ambient pressure, i.e. at vacuum conditions. The apparatus may be configured to reestablish a pressure less than ambient pressure, preferably a vacuum, after each injection of steam.

According to a preferred embodiment of the invention, the apparatus comprises a base and the method comprises moving, preferably rotating, the thawing chamber with respect to the base, during thawing the foodstuff. According to a particularly preferred embodiment, the thawing chamber is rotated about an axis of rotation with respect to the base. Such rotating thawing chamber may be a vessel of a thawing tumbler. The thawing chamber of the apparatus may comprise a sidewall, a bottom and top. The bottom and/or the top can be designed as a lid. The axis of rotation of the thawing chamber is preferably inclined relative to a horizontal plane. The angle of inclination is preferably altered based on, for example on the product to be thawed, the filling degree of the thawing chamber and/or the condition under which the thawing takes place.

The sensor of the apparatus may be arranged at a fixed location inside the thawing chamber such that the sensor is movable together with the thawing chamber.

According to a preferred embodiment of the invention, the method comprises detecting a position of the thawing chamber with respect to the base and measuring the transmission signal depending on the detected position of the thawing chamber. This may ensure that the space between the microwave transmitter and the microwave receiver is filled with foodstuff to be analyzed when the transmission signal is measured. It is particularly preferred that the level of frozenness is only sensed if the position of the thawing chamber detected by the position detector lies within a predefined range of positions. The predefined range of positions preferably includes one or more positions in which the sensor of the thawing chamber is situated in a lower area of the thawing chamber so that foodstuff is forced towards the sensor, in particular between the microwave transmitter and the microwave receiver, by the force of gravity.

According to a preferred embodiment of the invention, the method comprises stopping the movement of the thawing chamber when the thawing chamber is in a position in which the foodstuff is situated between the microwave transmitter and the microwave receiver at least for a predetermined period. The predetermined period may be less than 1 minute, preferably less than 10 seconds, more preferably less than 1 second. Implementing such a stop of the movement for a predetermined period may facilitate settlement of the foodstuff in the space between the microwave transmitter and the microwave receiver. Thereby, reliability of the transmission measurement and determination of the level of frozenness may be further improved.

According to a preferred embodiment of the invention, the method comprises determining a level of frozenness based on a transmission signal received by the microwave receiver when the thawing chamber is in a position in which the foodstuff is situated between the microwave transmitter and the microwave receiver. Analyzing the transmission signal, in particular comparing the amplitude of the signal transmitted by the microwave transmitter and the transmission signal received by the microwave receiver, may indicate an amount of energy absorbed by the foodstuff. It has been found that the amplitude of the transmission signal is well suited for indicating the level of frozenness of the foodstuff.

In this context, it is preferred that the method further comprises analyzing a phase of the transmission signal received by the microwave receiver, preferably a phase difference between the signal transmitted by the microwave transmitter and the transmission signal received by the microwave receiver. By analyzing both the amplitude and the phase of the transmission signal the reliability of determining the level of frozenness can be improved as compared to analyzing only the amplitude, in particular for foodstuff comprising bigger chunks.

According to a preferred embodiment of the invention, thawing of the foodstuff is stopped when the detected level of frozenness reaches a predetermined level. Thereby, the thawing process may be accurately terminated when a desired level of frozenness is reached. Overheating of the foodstuff and wasting of energy may be avoided.

With the inventive method the foodstuff may be supplied to the thawing chamber in a frozen state, for example at a temperature of −18° C. The foodstuff may be supplied as large bocks, each preferably comprising a multitude of individual chunks. Thawing may comprise heating at least the surface of the foodstuff to a temperature>0° C. During thawing, the thawing chamber preferably rotates and/or the product is moved inside the thawing chamber for example by one or more baffles and/or paddles which preferably move relative to the thawing chamber and/or the vessel rotates relative to the baffles and/or paddles. The thawing chamber, the baffles and/or paddles can be utilized to massage the product and/or to massage a liquid into the product. The sidewalls of the thawing chamber and/or the baffles and/or paddles are preferably heated and/or steam is added to the vessel to defrost the product.

These and other characteristics, features and advantages of the present invention will become apparent from the following detailed description, taken in conjunction with the accompanying figures, which illustrates, by way of example, the principles of the invention. The description is given for the sake of example only, without limiting the scope of the invention.

DETAILED DESCRIPTION

The present invention will be described with respect to embodiments and with reference to the figures, but the invention is not limited thereto but only by the claims. The figures described are only schematic and is non-limiting. In the figures, the size of some of the elements may be exaggerated and not drawn on scale for illustrative purposes.

Figure 1:
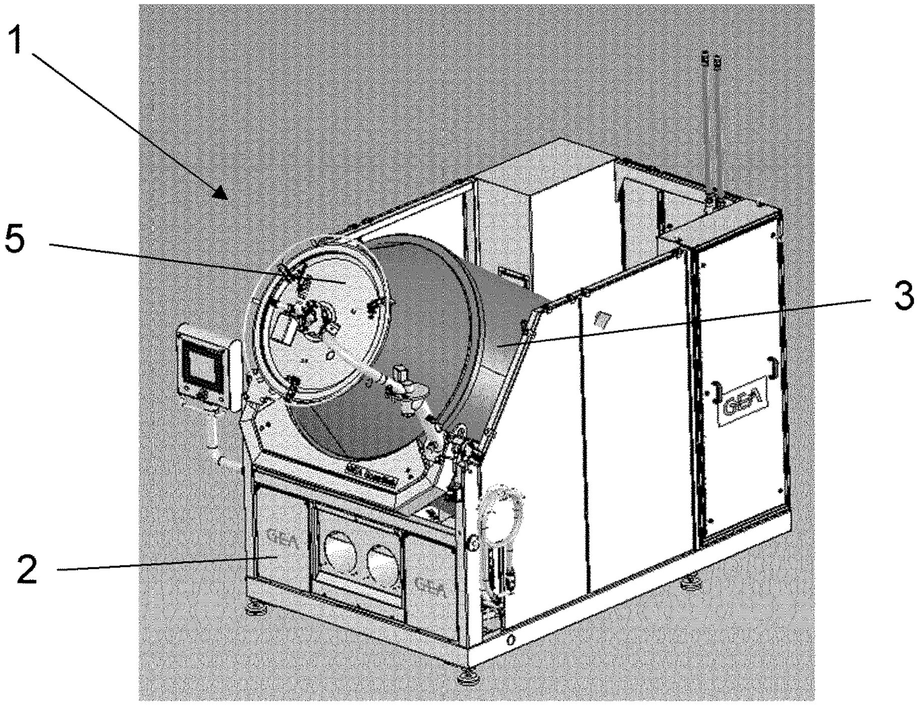
FIG. 1 shows an apparatus according to an embodiment of the present invention in a tumbling and/or thawing position.
Figure 2:
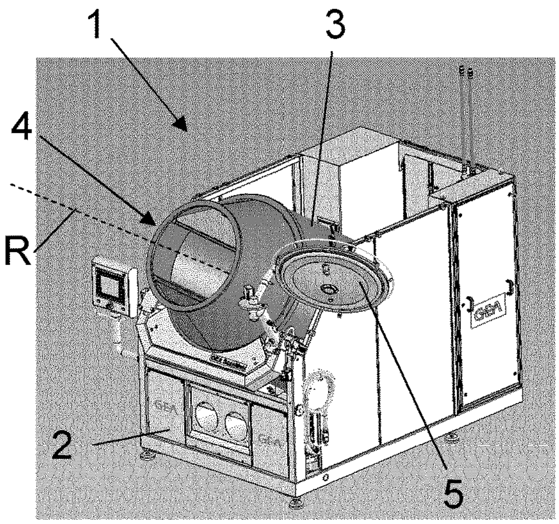
FIG. 2 shows the apparatus of FIG. 1 in a loading position.
Figure 3:
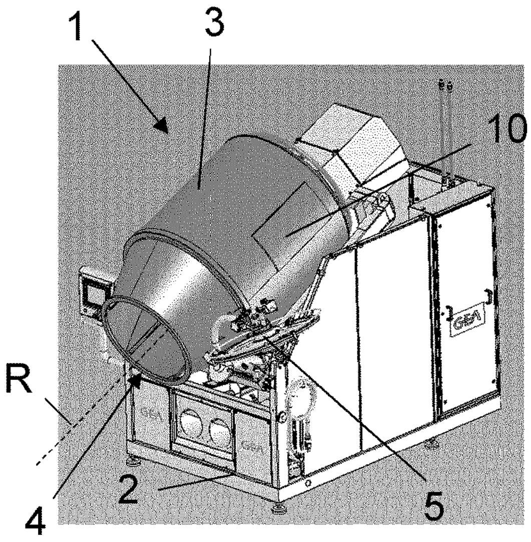
FIG. 3 shows the apparatus of FIG. 1 in an unloading position.

FIGS. 1, 2 and 3 depict an apparatus 1 for thawing foodstuff that is implemented as a thawing tumbler. The apparatus 1 comprises a base 2 and a thawing chamber 3 for accommodating foodstuff, which is moveable with respect to the base 2. The thawing chamber 3 may be tilted to be transferred between a first position in which an opening 4 of the thawing chamber 3 is in an upright position, see FIG. 1 and FIG. 2, into a second position in which the opening 4 is directed downwards, see FIG. 3. When the thawing chamber 3 is in this first position, the thawing chamber 3 may be filled with foodstuff. The second position may be taken for discharging the foodstuff from the thawing chamber 3.

The thawing chamber 3 is further movable with respect to the base 2 wherein the opening 4 either stays in its upward or downward directed position. In particular, the thawing chamber 3 may be rotated about an axis of rotation R, preferable for massaging or tumbling the foodstuff accommodated in the thawing chamber 3. According to the exemplary embodiment, the thawing chamber 3 is essentially cylindrical, and the axis of rotation R is the cylinder axis of the essentially cylindrical thawing chamber.

Figure 5:
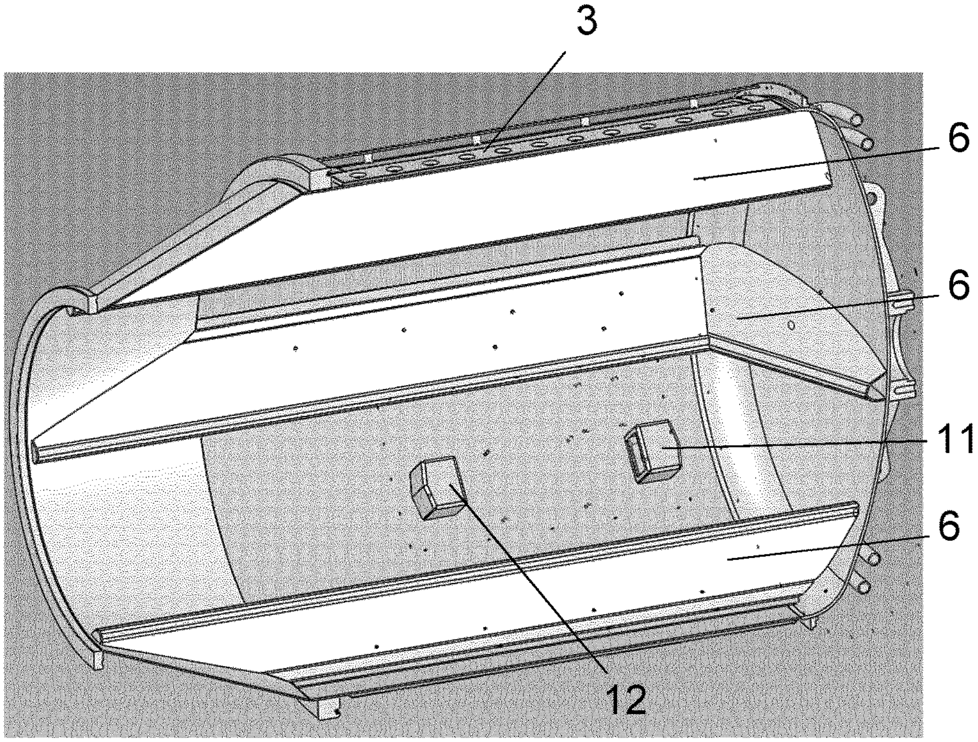
FIG. 5 shows a sectional view of the thawing chamber of FIG. 4.

The thawing chamber will in detail be explained with reference to FIGS. 5 and 6. The thawing chamber 3 includes a sensor 10 for sensing a level of frozenness of the foodstuff accommodated in the thawing chamber 3, which sensor is arranged at a fixed location inside the thawing chamber 3 such that the sensor 10 is movable, in particular rotatable, together with the thawing chamber 3. The sensor 10 comprises a first antenna that serves as a microwave transmitter 11 and a second antenna which serves as a microwave receiver 12 that is spaced from the microwave transmitter 11. The microwave receiver 12 is configured to receive a transmission signal transmitted by the microwave transmitter 11. The sensor 10 is integrated into a sidewall of the thawing chamber 3 so that the microwave transmitter 11 and the microwave receiver 12 both face the interior of the thawing chamber 3. Both, the microwave transmitter 11 and the microwave receiver 12 are arranged inside the thawing chamber 3 such that the foodstuff is, at least temporarily, situated between the microwave transmitter 11 and the microwave receiver 12 during a thawing process carried out with the apparatus 1.

Figure 6:
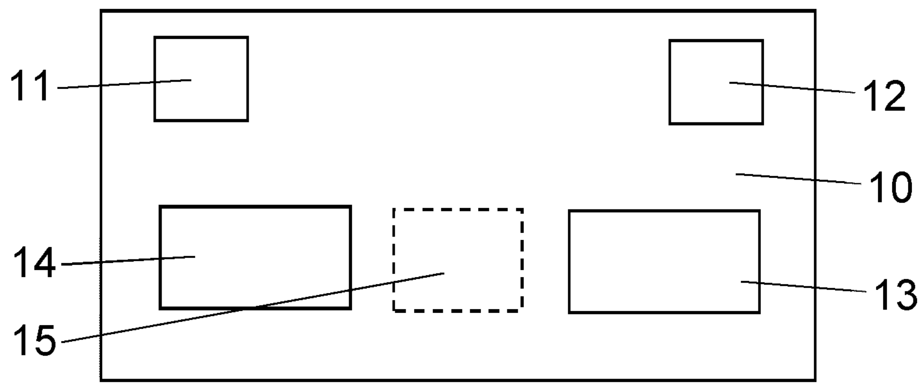
FIG. 6 shows a block diagram of the sensor of the apparatus depicted in FIG. 1.

As depicted in FIG. 6, the sensor 10 comprises the microwave transmitter 11, the microwave receiver 12. The sensor 10 further comprises an electrical energy storage 13, preferably a battery. Another element of the sensor 10 is processing unit 14 connected to the microwave transmitter 11 and the microwave receiver 12 as well as the electrical energy storage 13.

Figure 4:
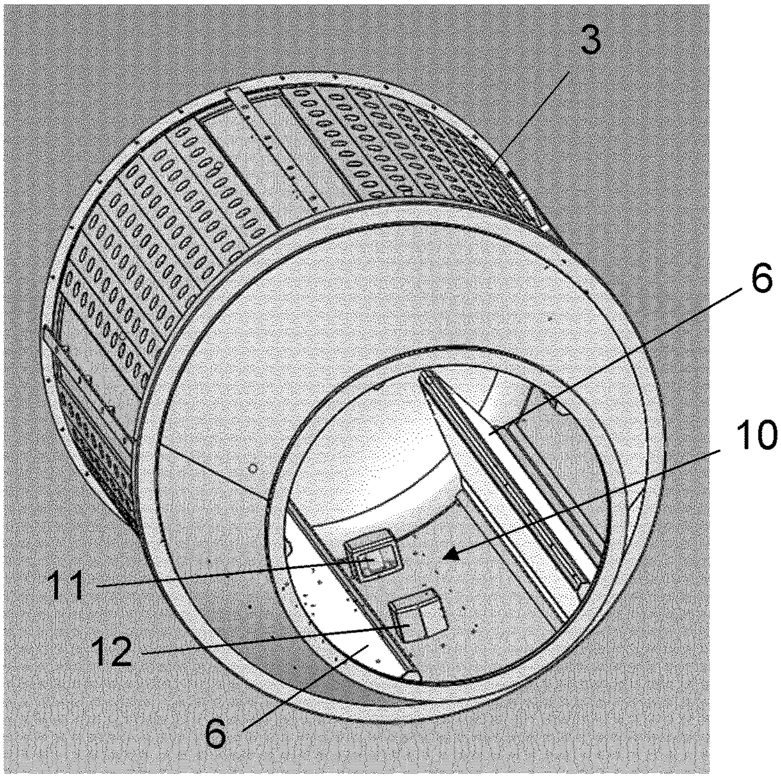
FIG. 4 shows the interior of the thawing chamber of the apparatus of FIG. 1.

The apparatus further includes a position detector 15 for detecting a position of the thawing chamber 3, in particular a position of the sensor 10, with respect to the base 2. The position detector 15 may be implemented as part of the sensor 10 as depicted in FIG. 6. Alternatively, the position detector 15 may be separate from the sensor 10, e.g. attached to the base 2 of the apparatus 1. According to the shown embodiment, the apparatus 1 is configured to sense the level of frozenness depending on the position of the thawing chamber 3 detected by the position detector 15. Here, the level of frozenness is only sensed if the position of the thawing chamber 3 detected by the position detector 15 lies within a predefined range of positions. The predefined range of positions preferably includes one or more positions in which the sensor 10 of the thawing chamber 3 is situated in a lower area of the thawing chamber 3 so that foodstuff is forced towards the sensor 10, in particular between the microwave transmitter 11 and the microwave receiver 12, by the force of gravity. Such a position is depicted in FIG. 4. In this position, it may be ensured that foodstuff is present between the microwave transmitter 11 and the microwave receiver 12 in order to correctly determine the level of frozenness of the foodstuff.

Figure 7:
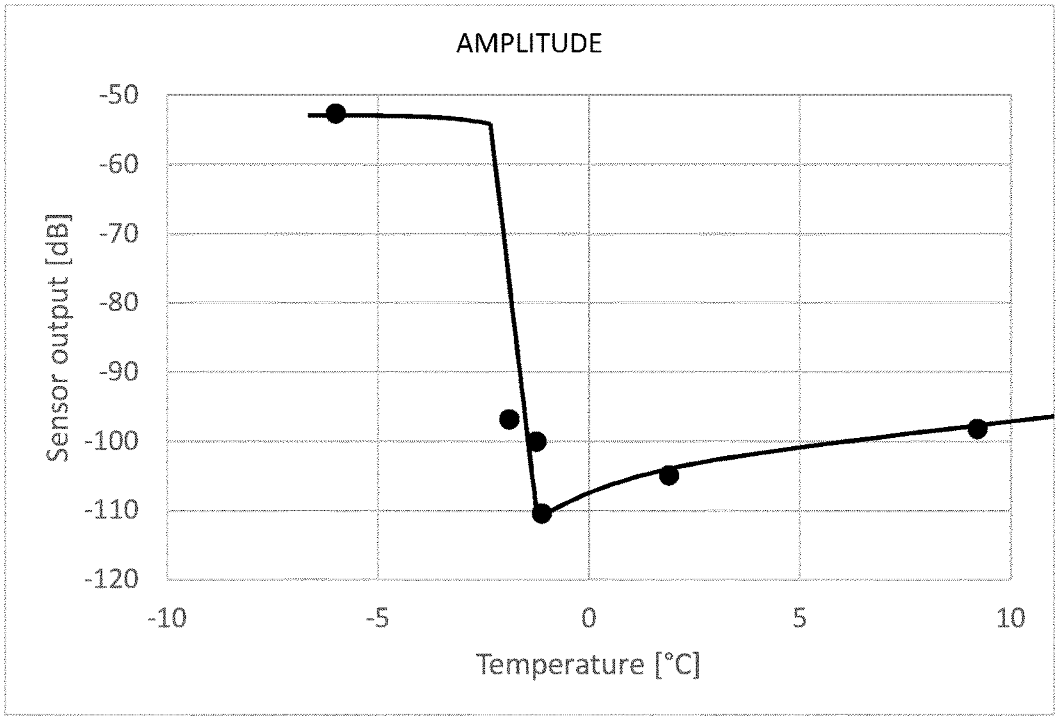
FIG. 7 shows the amplitude of a transmission signal vs. temperature.

The processing unit 14 is configured to analyze the amplitude of the transmission signal received by the microwave receiver 12. An exemplary measurement of an output signal of the sensor 10 vs. temperature is shown in FIG. 7. The output signal 10 is proportional to the amplitude of the transmission signal received by the microwave receiver 12, in particular proportional to the ratio of the amplitude of the transmission signal received by the microwave receiver 12 to the signal transmitted by the microwave transmitter 11. In the transition phase between solid and liquid—here the temperature range between −5° C. and 5° C.— the amplitude of the transmission signal changes considerably, so that a change in level of frozenness can be detected.

Figure 8:
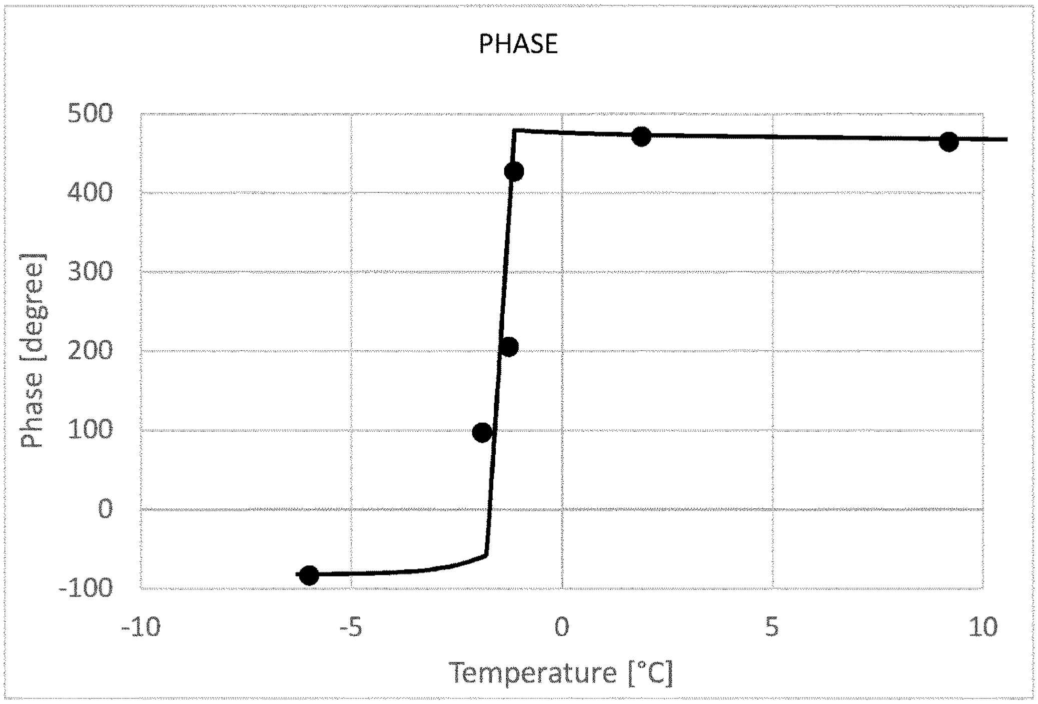
FIG. 8 shows the phase of a transmission signal vs. temperature.

Optionally, the processing unit is further configured to analyze a phase shift of the transmission signal received by the microwave receiver 12. An exemplary phase shift measurement vs. temperature is shown in FIG. 8. The phase of the transmission signal as received by the microwave receiver 12 may be defined relative to the phase of the signal transmitted by the microwave transmitter 11. Similar to the effect shown in FIG. 7 for the amplitude, the phase changes considerably in the transitional phase between solid and liquid—here the temperature range between −5° C. and 5° C.

The apparatus 1 further includes a controller that is connected to the sensor 10 via a communication link, preferably a wireless communication link, wherein the controller 10 is configured to stop the thawing process depending on the level of frozenness detected by the sensor 10.

According to an alternative embodiment not shown in the figures, the apparatus may be provided in the form of a thawing mixer. The thawing mixer may include a stationary thawing chamber with movable mixing elements. The sensor may be arranged in the bottom region of the thawing chamber so that the space between the microwave transmitter and the microwave receiver is filled with foodstuff with high probability.

The aforementioned embodiments of apparatuses 1 for thawing foodstuff include a thawing chamber 3 includes a sensor 10 for sensing a level of frozenness of the foodstuff accommodated in the thawing chamber 3. The sensor 10 comprises a microwave transmitter 11 and a microwave receiver 12 that is spaced from the microwave transmitter 11, the microwave receiver 12 further being configured to receive a transmission signal transmitted by the microwave transmitter 11. The microwave transmitter 11 and the microwave receiver 12 are arranged inside the thawing chamber 3 such that the foodstuff is, at least temporarily, situated between the microwave transmitter 11 and the microwave receiver 12 during a thawing process carried out with the apparatus 1. Thereby, the level of frozenness of foodstuff accommodated in the thawing chamber 3 can be reliably measured.

REFERENCE SIGNS

1 apparatus for thawing foodstuff
2 base
3 thawing chamber
4 opening
5 lid
6 baffle
10 sensor
11 transmitter
12 receiver
13 energy storage
14 processing unit
15 position detector
R axis of rotation

The invention claimed is:

1. An apparatus for thawing foodstuff comprising a base and a thawing chamber for accommodating the foodstuff, the thawing chamber is arranged movably with respect to the base such that the thawing chamber is movable with respect to the base during a thawing process, wherein the thawing chamber comprises a sensor for sensing a level of frozenness of the foodstuff in the thawing chamber, the sensor is arranged at a fixed location inside of the thawing chamber and the sensor is movable together with the thawing chamber during the thawing process in which the thawing chamber rotates relative to the base, the sensor comprising a microwave transmitter and a microwave receiver that is spaced from the microwave transmitter, the microwave receiver configured to receive a transmission signal transmitted by the microwave transmitter, the microwave transmitter and the microwave receiver are arranged on an inside wall of the thawing chamber such that, during the thawing process, the foodstuff is, at least temporarily, situated between the microwave transmitter and the microwave receiver, the microwave transmitter and the microwave receiver being positioned on opposite sides of the foodstuff.

2. The apparatus according to claim 1, wherein the apparatus or the sensor comprises a position detector for detecting a position of the thawing chamber or a position of the sensor with respect to the base, wherein the apparatus is configured to sense the level of frozenness of the foodstuff depending on the position detected by the position detector.

3. The apparatus according to claim 1, wherein the apparatus or the sensor comprises a position detector for detecting a position of the thawing chamber or a position of the sensor with respect to the base, wherein the apparatus is configured to sense the level of frozenness of the foodstuff depending on the position detected by the position detector and only if the position detected by the position detector lies within a predefined range of positions.

4. The apparatus according to claim 1, wherein the apparatus or the sensor includes a processing unit that is configured to analyze an amplitude of the transmission signal received by the microwave receiver.

5. The apparatus according to claim 4, wherein the processing unit is configured to analyze a phase of the transmission signal received by the microwave receiver, or to analyze a phase difference between a signal transmitted by the microwave transmitter and the transmission signal received by the microwave receiver.

6. The apparatus according to claim 1, wherein the sensor comprises an electrical energy storage or a battery.

7. The apparatus according to claim 1, wherein the thawing chamber comprises one or more mixing elements that are movably or rotatably arranged inside the thawing chamber.

8. The apparatus according to claim 1, wherein a steam generator is connected to the thawing chamber to feed steam into the thawing chamber.

9. The apparatus according to claim 1, wherein a vacuum generator is connected to the thawing chamber to create a vacuum inside the thawing chamber.

10. The apparatus according to claim 1, wherein a controller is connected to the sensor via a communication link or a wireless communication link, the controller is configured to stop the thawing process depending on the level of frozenness detected by the sensor.

11. The apparatus according to claim 1, wherein the sensor is fixed to an inside wall of the thawing chamber, at a region between a bottom of the thawing chamber and a lid.

12. The apparatus according to claim 1, wherein the microwave receiver is configured to receive the transmission signal transmitted by the microwave transmitter for sensing the level of frozenness of the foodstuff in the thawing chamber while the thawing chamber rotates relative to the base.

13. The apparatus according to claim 1, wherein the apparatus or the sensor comprises a position detector that comprises a motion sensor, an angle encoder, or an angle sensor.

14. The apparatus according to claim 1, wherein the thawing chamber is configured to temporarily stop rotating when the thawing chamber is in a position in which the foodstuff is situated between the microwave transmitter and the microwave receiver.

15. The apparatus according to claim 1, wherein the thawing chamber comprises one or more baffles configured to move the foodstuff within the thawing chamber during rotation of the thawing chamber, wherein the one or more baffles are heated.

16. The apparatus according to claim 3, wherein the predefined range of positions includes one or more positions in which the sensor is situated in a lower area of the thawing chamber so that the foodstuff is forced toward the sensor by the force of gravity.

17. A method for thawing foodstuff in a thawing apparatus comprising a base and a thawing chamber for accommodating the foodstuff, the thawing chamber includes a sensor for sensing a level of frozenness of the foodstuff accommodated in the thawing chamber, the sensor comprising a microwave transmitter and a microwave receiver that is spaced from the microwave transmitter, the method comprising:

thawing the foodstuff in the thawing chamber, wherein during the thawing, the foodstuff is, at least temporarily, situated between the microwave transmitter and the microwave receiver of the sensor, the microwave transmitter and the microwave receiver being disposed on opposite sides of the foodstuff, moving or rotating the thawing chamber with respect to the base, wherein the sensor is arranged at a fixed location inside the thawing chamber such that the sensor is movable together with the thawing chamber;

measuring a transmission signal transmitted by the microwave transmitter using the microwave receiver; and determining the level of frozenness based on the transmission signal received by the microwave receiver when the thawing chamber is in a position in which the microwave transmitter and the microwave receiver are positioned on opposite sides of the foodstuff, and the foodstuff is situated between the microwave transmitter and the microwave receiver, wherein the thawing step is stopped when the detected level of frozenness reaches a predetermined level.

18. The method according to claim 17, wherein the method comprises detecting a position of the thawing chamber with respect to the base and measuring the transmission signal depending on the detected position of the thawing chamber.

19. The method according to claim 18, wherein the method comprises stopping movement of the thawing chamber when the thawing chamber is in a position in which the foodstuff is situated between the microwave transmitter and the microwave receiver at least for a predetermined period.

20. The method according to claim 17, wherein the sensor is fixed to an inside wall of the thawing chamber, at a region between a bottom of the thawing chamber and a lid, wherein the microwave transmitter and the microwave receiver are arranged on the inside wall of the thawing chamber along a common axis, and wherein the microwave transmitter and the microwave receiver rotate together with the thawing chamber when the thawing chamber rotates.

* * * * *